United States Patent [19]
Hineno et al.

[11] Patent Number: 5,428,596
[45] Date of Patent: Jun. 27, 1995

[54] OPTICAL PICKUP APPARATUS

[75] Inventors: Satoshi Hineno, Kanagawa; Yoshito Asoma, Saitama; Nobuhiko Ando, Tokyo, all of Japan

[73] Assignee: Sony Corporation, Tokyo, Japan

[21] Appl. No.: 264,621

[22] Filed: Jun. 23, 1994

Related U.S. Application Data

[63] Continuation of Ser. No. 958,943, Oct. 9, 1992, abandoned.

[30] Foreign Application Priority Data

Oct. 18, 1991 [JP] Japan .................. 3-297634

[51] Int. Cl.$^6$ .................................. G11B 7/095
[52] U.S. Cl. .................. 369/110; 369/112; 369/44.23
[58] Field of Search ............. 369/109, 110, 112, 116, 369/118, 44.21, 44.23, 44.11, 44.12, 44.14, 44.24; 359/495, 496; 250/201.5

[56] References Cited

U.S. PATENT DOCUMENTS

| | | |
|---|---|---|
| 4,682,315 | 7/1987 | Uejima .................. 369/110 |
| 4,771,414 | 9/1988 | Yoshimatsu .................. 369/110 |
| 4,873,678 | 10/1989 | Nakamura et al. .................. 369/110 |
| 5,004,900 | 4/1991 | Seya et al. .................. 250/201.5 |
| 5,189,650 | 2/1993 | Watanabe et al. .................. 369/110 |
| 5,189,651 | 2/1993 | Utsumi .................. 369/110 |
| 5,189,655 | 2/1993 | Ogata et al. .................. 369/112 |
| 5,272,685 | 12/1993 | Ando .................. 369/110 |

FOREIGN PATENT DOCUMENTS

| | | | |
|---|---|---|---|
| 0270847A2 | 6/1988 | European Pat. Off. | G11B 7/12 |
| 0439876A1 | 8/1991 | European Pat. Off. | G11B 7/09 |
| 60-151855 | 8/1985 | Japan | G11B 11/10 |
| 2273353 | 11/1990 | Japan | 369/110 |
| 3084745 | 7/1991 | Japan | G11B 7/135 |

Primary Examiner—Paul M. Dzierzynski
Assistant Examiner—Don Wong
Attorney, Agent, or Firm—Limbach & Limbach

[57] ABSTRACT

An optical pickup apparatus for recording information signals on an optical recording medium. The apparatus includes a light source radiating a diverging light flux, an object lens on which a light flux radiated from said light source is incident, for converging the light flux on the optical recording medium, a light flux dividing device arranged at a position on a light path between the light source and the object lens at which the light flux remains a diverging light flux, which light flux dividing device divests reflected light flux from the optical recording medium out of the light path, a light detection unit for detecting the reflected light diverted from the light path by the light flux dividing device, and a polarized light dependent light flux separating device arranged at a position on a light path between the light flux dividing device and the light detection device at which the reflected light flux is a converging light flux. In this manner, recording characteristics of information signals may be improved and a simplified structure and a small size of the apparatus may be realized.

4 Claims, 4 Drawing Sheets

OPTICAL PICKUP APPARATUS

This is a continuation of application Ser. No. 07/958,943 filed on Oct. 9, 1992 now abandoned.

BACKGROUND OF THE INVENTION

1. Field of the Invention

This invention relates to an optical pickup apparatus for writing or reading information signals on or from a recording medium such as a magneto-optical disc. More particularly, it relates to an optical pickup apparatus in which a light beam radiated from a light source is radiated via an object lens to an information recording medium and in which the return light beam reflected from the information recording medium is detected by light detection means for reading out the information signals recorded on the information recording medium.

2. Description of the Prior art

An information recording medium for writing information signals by optical means has been proposed. A magneto-optical disc, typical of this type of the information recording medium, is made up of a disc substrate, and a signal recording layer. The signal recording layer is formed of a material having its direction of magnetization inverted by heating it to a temperature higher than the Curie temperature and applying a corresponding magnetic field. An optical pickup apparatus is employed for writing and reading information signals on or from the information recording medium.

Referring to FIG. 1, a conventional optical pickup apparatus is made up of a laser diode device 1, as a light source, and an object lens 9, adapted for converging the light flux radiated from the laser diode element 1 on signal recording layer 21 of disc 23. The optical pickup apparatus is also provided with a photodetector 12 for detecting the light flux converged on and reflected from the signal recording layer.

The laser diode device 1 is provided with a can-shaped package and radiates light upon being supplied with current from plural terminals. The laser device 1 includes a semiconductor chip arranged in the package and radiates light from a terminal end of an active layer of the semiconductor chip. The laser diode device is a point source of light. The light flux radiated from laser diode device 1 is collimated by a collimator lens 7 before being incident on a polarized beam splitter 5. The object lens 9 converges the light flux on a signal recording surface which is a boundary surface between a signal recording layer 21 of a magneto-optical disc 23 and a disc substrate 20.

On the signal recording surface, the information signals are written on spirally extending substantially concentric recording tracks.

The light flux converged on the signal recording surface is reflected by the signal recording surface so as to be re-incident as a reflected light flux on the object lens 9. The reflected light flux is collimated by lens 9 before being re-incident on the polarized beam splitter 5. The reflected light flux re-incident on the polarized beam splitter 5 is reflected for the most part by a semi-transmitting film 6 within polarized beam splitter 5 so as to be incident on a three-beam Wollaston prism 11. The semi-transmitting film 6 of the polarized beam splitter 5 is so designed that, of the reflected light flux, about 95% of the S-polarized light is reflected by the semi-transmitting film 6 and about 80% of the P-polarized light component is transmitted through the semi-transmitting film 6.

The reflected light flux incident on three-beam Wollaston prism 11 is transmitted through prism 11 so as to be converged by a condenser lens 22 on a light receiving surface of the photodetector 12.

The photodetector 12 has plural light receiving surfaces and is provided within a package. The photodetector 12 is designed to output the intensity of the fluxes of the light received by the light receiving surfaces as electrical signals. The electrical signals outputted from the photodetector 12 are signals which are indicative of detected changes in the intensity of the reflected light flux, changes in the polarization of said light, or changes in the extent of its astigmatism.

For writing information signals on magneto-optical disc 23, the optical pickup device converges the flux of light radiated from the laser diode device 1 on the signal recording layer 21 for locally heating the signal recording layer 21. At this time, an external magnetic field is applied to the signal recording layer 21 by a magnetic device 17, as shown in FIG. 1. The state of light flux convergence on the signal recording layer 21 and adjustment of the position of radiation of the light flux on the signal recording layer 21 may also be adjusted at this time based on the various information produced on the basis of electrical signals outputted from photodetector 12.

Information signals may be read by the optical pickup device from magneto-optical disc 23 on the basis of the information derived from photodetector device 12 while the light flux radiated by the laser diode element is converged and radiated on the signal recording layer 21.

In the above-described optical pickup device, the polarized beam splitter 5 is arranged at a point on a light path between the laser diode device 1 and the object lens 9 where the light flux is a collimated light beam. The three-beam Wollaston prism 11 is also so arranged that collimated light flux reflected by reflective film 6 of polarized beam splitter 5 is incident on prism 11.

This is because if polarized beam splitter 5 were arranged in a converging light flux or in a diverging diffused light flux, there would be a tendency to produce double refraction at reflective film 6 of polarized beam splitter 5. If double refraction should be produced at reflective film 6, the so-called CN ratio is lowered to render it impossible to read out information signals from the magneto-optical disc 23 satisfactorily. The double refraction can be produced because the semi-transmitting film 6 of the polarization beam splitter 5 has incident angle dependent incident light flux transmittance so that phase differences are produced at the semi-transmitting film 6 between the P-polarization component and the S-Polarization component of the converging or diverging light fluxes.

In a read-only optical pickup apparatus, to reduce the size and the structure of the apparatus, the beam splitter can be placed at a position on a light path of the reflected light flux from the optical disc which the reflected light flux is a converging light beam. If the beam splitter is arranged in a converging light flux, the void space between laser diode device 1 and collimator lens 7 may be utilized efficiently and converging lens 22 may be eliminated to render it possible to reduce the size and the structure of the optical pickup apparatus. In other words, the fact that the polarized beam splitter 5 has to be provided in a collimated light flux hinders attempts to achieve a simpler structure and a smaller size of the optical pickup apparatus.

There is disclosed in U.S. Pat. No. 4,771,414 an optical pickup apparatus in which a three-beam Wollaston prism is used for introducing a light beam reflected from a signal recording surface of a magneto-optical disc into a photodetector.

OBJECTS AND SUMMARY OF THE INVENTION

It is an object of the present invention to provide an optical pickup apparatus which renders it possible to record information signals on an information recording medium with satisfactory recording characteristics.

It is another object of the present invention to provide an optical pickup apparatus with simplified construction and reduced size.

In accordance with the present invention, there is provided an optical pickup apparatus for recording information signals on an optical recording medium, comprising a light source radiating a diverging light flux, an object lens on which a light flux radiated from said light source is incident and which converges the light flux on said optical recording medium, a light flux separating device arranged at a position along a light path between said light source and said object lens at which said light flux remains a diverging light beam, said light flux separating device being adapted for diverting reflected light flux reflected by said optical recording medium out of said light path, and a polarized light dependent light flux separating device arranged at a position along a light path between said light flux separating device and a photodetector at which said reflected light flux is a converging light beam.

The above and other objects of the present invention will become apparent from the following description.

BRIEF DESCRIPTION OF THE DRAWINGS

FIG. 6A shows the relation between the incident angle and the transmittance of the light flux of the P-polarized light, FIG. 6B shows the relation between the incident angle and the reflectance of the light flux of the S-polarized light and FIG. 6C shows the relation between the incident angle and the phase difference of the light flux.

DESCRIPTION OF THE PREFERRED EMBODIMENT

Figure 1:
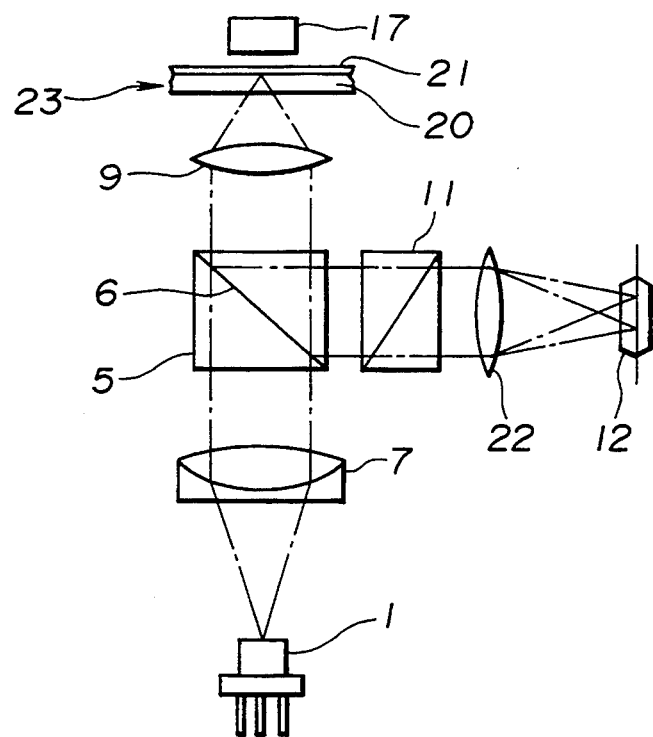
FIG. 1 is a schematic side elevational view showing a conventional optical pickup apparatus.
Figure 2:
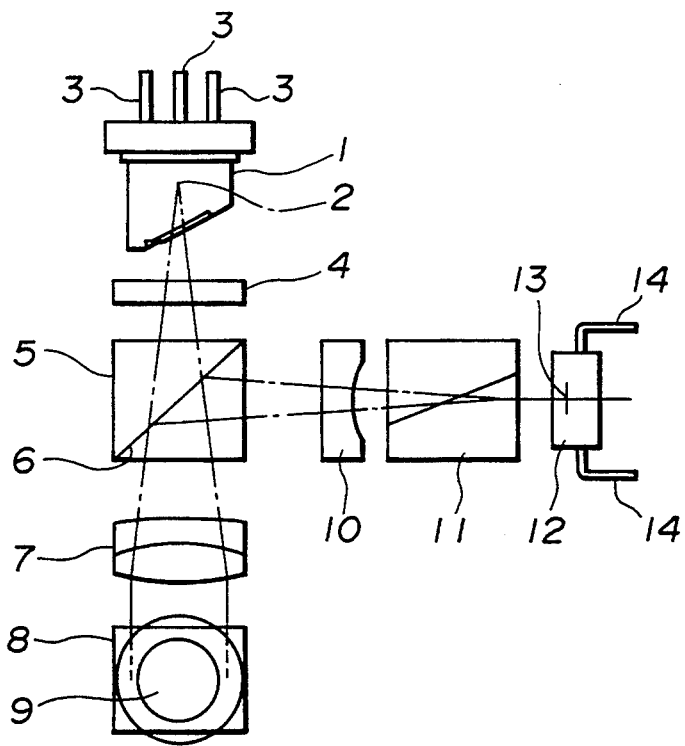
FIG. 2 is a schematic plan view showing the construction of an optical pickup apparatus according to the present invention.

Referring to FIG. 2, the optical pickup apparatus according to the present invention includes a laser diode 2, as a light source, and an object lens 9, for converging the light flux radiated by laser diode 2 on a magneto-optical disc as an information recording medium. The optical pickup apparatus also includes a photodetector 13 for detecting the light flux converged on and reflected back from the magneto-optical disc.

The laser diode 2 is arranged in a can-shaped package 1 and fed with current via plural terminals 3 to emit the light. Laser diode 2 is arranged as a semiconductor chip having an active layer the end of which radiates the flux of light. The laser diode 2 is a substantially point source of light.

The light flux radiated from the laser diode 2 is separated into multiple (preferably three) parallel light fluxes having different proceeding directions by being transmitted through a diffraction grating 4 before being incident on a polarization beam splitter 5 operated as a light flux splitting device. About 63% of the light flux is transmitted through semi-transmitting film 6 of splitter 5 so as to be incident on collimator lens 7. The light fluxes incident on collimator lens 7 are collimated by the collimator lens 7. The collimated light flux is reflected by about 90° in its light path by reflection by a planar reflective mirror 8 before being incident on an object lens 9. The object lens 9 converges the light fluxes on a signal recording surface (not shown in FIG. 2) which is the boundary between a signal recording layer of a magneto-optical disc and the disc substrate.

On the signal recording surface, information signals are written along a spirally extending substantially concentric recording track. The light fluxes separated by the diffraction grating 4 preferably include a main beam and two side sub-beams, and are radiated on the signal recording surface so as to straddle the recording track for executing a tracking error detection system known as a so-called three-beam system. The positional deviation between the radiated position of the main central beam and the recording track may be detected by comparing the intensities of reflected light of both side beams by the signal recording surface.

The light fluxes converged on the signal recording surface are reflected by the signal recording surface so as to be re-incident as reflected light fluxes on the object lens 9. The reflected light fluxes thus re-incident on the object lens 9 are substantially collimated by lens 9 so as to be re-incident on the collimator lens 7 via the planar reflective mirror 8. The reflected light fluxes re-incident on the collimator lens 7 are converged to become converged light fluxes which are again incident on the polarized beam splitter 5.

Figure 6A:
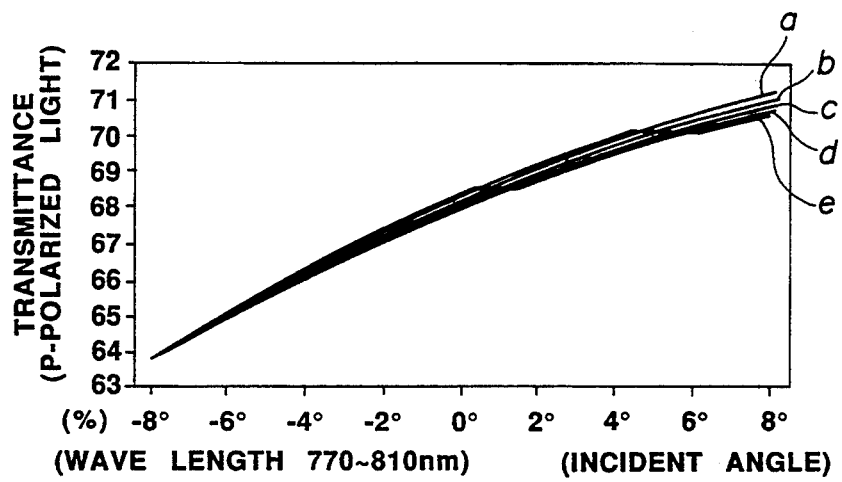
FIGS. 6A to 6C are graphs showing characteristics of a polarized beam splitter constituting the optical pickup apparatus where
Figure 6B:
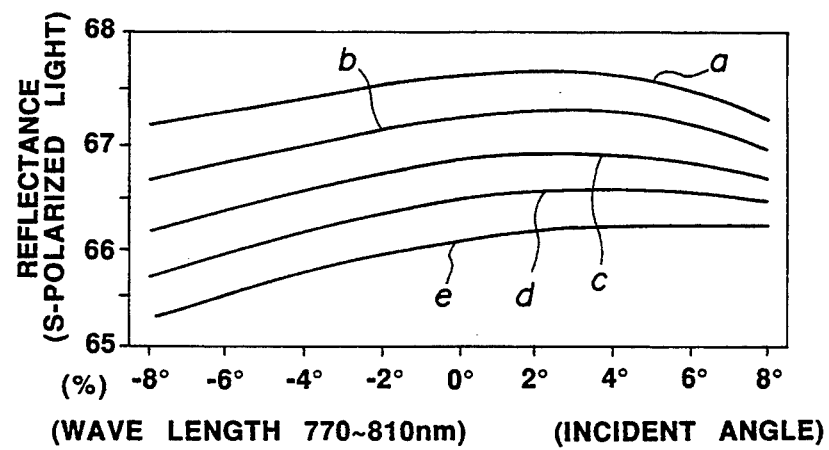
Figure 6C:
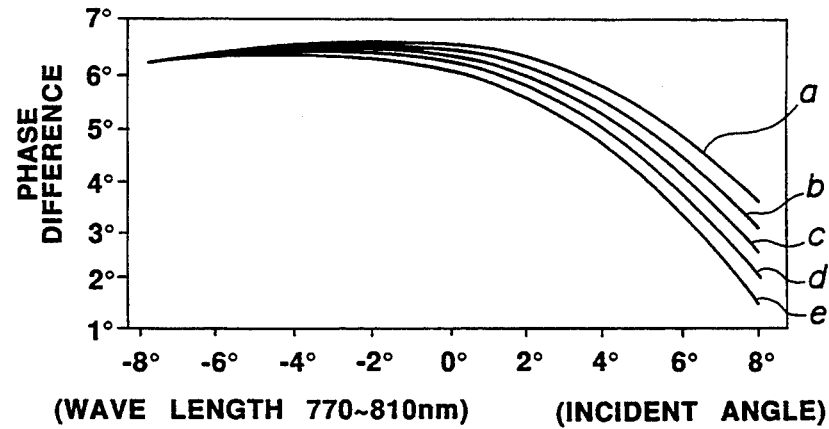

The reflected light flux, which is the converged light flux re-incident on the beam splitter 5, is substantially in the state of S-polarized light at the semi-transmitting film 6 of the polarized beam splitter 5. Referring to the graph of FIG. 6A, as for the light flux incident on the polarized beam splitter 5 at an incident angle of 0°, that is at a right angle, and on the semi-transmitting film 6 at an angle of 45° about 68% of the P-polarized light component is transmitted through the semi-transmitting film 6. Referring to the graph of FIG. 6B, as for the light flux incident on the polarized beam splitter 5 at an incident angle of 0° about 67% of the S-polarized component is reflected by the semi-transmitting film 6. In the graphs of FIGS. 6A to 6C, curves a, b, c, d, and e indicate characteristics for the wavelengths of 770 nm, 780 nm, 790 nm, 800 nm and 810 nm of the incident light fluxes, respectively.

The reflectance of the semi-transmitting film 6 has only low dependency on the direction of polarization, the reflectance has only low dependency on the angle of incidence of the light flux as shown in the graph of FIG. 6B. Consequently, even although the reflected light fluxes incident on the polarized beam splitter 5 are converging light fluxes, double refraction is not produced in the reflected light fluxes. That is, the phase difference between the P-polarized light component and the S-polarized light component at the semi-transmitting film 6 is not significantly increased despite fluctuations in the incident angle, as shown in the graph of FIG. 6C.

The reflected light flux reflected by the semi-transmitting film 6 is guided outside of the light path between the laser diode 2 and the object lens 9 so as to be transmitted through a cylindrical lens 10 before being incident on a three-beam Wollaston prism 11 which is a polarization-dependent light flux separating device.

The cylindrical lens 10 is a lens having a cylindrical surface producing astigmatism in the light flux transmitted therethrough. Although the cylindrical lens 10 may be planar on its one side and cylindrical on its other side, the above-mentioned one side may be convex or concave depending on the position of the photodetector 13.

The three-beam Wollaston prism 11 is formed by a pair of triangular prisms, each of which is a uniaxial crystal of quartz, rutile or calcite and which are bonded to one another to form a rectangular-shaped prism. The directions of crystal axes of the triangular prisms are normal to the optical axes and cross-linked at an angle of 45° with one another. The reflected light fluxes incident on the three-beam Wollaston prism 11 are incident substantially at right angles to the outer lateral sides of the three-beam Wollaston prism 11 so as to be obliquely transmitted through the junction surface of the two triangular prisms. Consequently, the reflected light flux is refracted in different directions, depending on the direction of polarization, when transmitted though the junction surface of the triangular prism, so that the reflected light flux is separated into three light fluxes by the prism 11.

That is, the reflected light flux incident on and transmitted through the three-beam Wollaston prism 11 has astigmatism introduced to it by the cylindrical lens 10, just before prism 11 separates it into three light fluxes having different proceeding directions depending on the difference in the direction of polarization.

Figure 5:
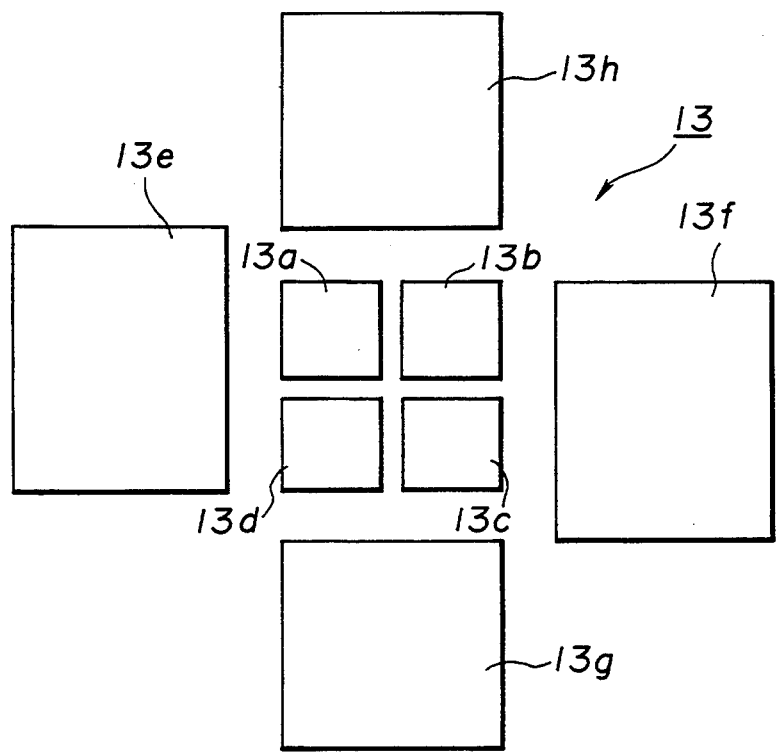
FIG. 5 is a plan view showing light receiving surfaces of a photodetector of the optical pickup apparatus useful in the apparatus of FIG. 1, 2, 3, or 4.

The reflected light fluxes transmitted through the three-beam Wollaston prism 11 are converged on the photodetector 13. Referring to FIG. 5, the photodetector 13 is composed of first to eighth light-receiving sections 13a, 13b, 13c, 13d, 13e, 13f, 13g and 13h, and is contained in a package 12 (shown in FIG. 2). The photodetector 13 is adapted for converting the light intensity of light fluxes received by the light-receiving sections 13a to 13h into electrical light detection signals which are outputted at plural terminals 14 associated with the light-receiving surfaces 13a to 13h. The light fluxes converged on the photodetector 13 are the light fluxes separated by the diffraction grating 4 and reflected so as to be separated by the three-beam Wollaston prism 11 in accordance with the direction of polarization. Light detection signals corresponding to the light intensities of these light fluxes may be produced from output signals of the photodetector 13. The first to fourth light-receiving surfaces 13a to 13d are arranged in adjacency to one another in the manner of radially dividing the central one of the reflected light fluxes, that is the sole light-receiving surface arranged on the optical axis of the main beam, into four equal parts with the point of intersection of the sole light-receiving surface with the optical axis as a center. These first to fourth light-receiving surfaces 13a, 13b, 13c and 13d are arranged so that the direction passing through the first and third light receiving surfaces 13a, 13c and the direction passing through the second and fourth light-receiving surfaces 13b, 13d are aligned with the direction of the astigmatism produced by the cylindrical lens 10.

The fifth and sixth light-receiving surfaces 13e, 13f are sized to contain the first to fourth light-receiving surfaces 13a to 13d and are arranged on both sides of the first to fourth light-receiving surfaces 13a to 13d. These fifth and sixth light-receiving surfaces 13e and 13f on one hand and the first to-fourth light-receiving surfaces 13a to 13d correspond to the points of light convergence of the light fluxes separated by the diffraction grating 4 and reflected by the half transmitting film 6.

The seventh and eighth light-receiving surfaces 13g, 13h are sized to contain the first to fourth light-receiving surfaces 13a to 13d and are arranged on both sides of the first to fourth light-receiving surfaces 13a to 13d with the direction of interconnecting the light-receiving surfaces 13g, 13h being at right angles to the direction interconnecting the fifth and sixth light-receiving surfaces 13e, 13f. These seventh and eighth light-receiving surfaces 13g and 13h on one hand and the first to fourth light-receiving surfaces 13a to 13d on the other hand correspond to the points of light convergence of the light fluxes reflected by the half-transmitting film 6 and separated by the diffraction grating 4.

With the present light detection means, changes in the light intensity of the reflected light flux, changes in the state of polarization, or changes in the degree of astigmatism, may be detected on the basis of the above-mentioned light detection signals.

That is, with the above light detection signals, difference signals of light detection signals corresponding to the light fluxes separated by the three-beam Wollaston prism 11, that is G-H, where G is the light detection signal by the seventh light-receiving surface 13g and H is the light detection signal by the eighth light-receiving surface 13h, represents a readout signal of the information signals written on the magneto-optical disc.

On the other hand, with the above light detection signals, difference signals of light detection signals corresponding to the light fluxes separated by the diffraction grating 4, that is E-F, where E is the light detection signal by the fifth light-receiving surface 13e and F is the light detection signal by the sixth light-receiving surface 13f, represents a so-called tracking error signal indicating the deviation of the main beam from the recording tack.

Besides, the light fluxes received by the light-receiving surfaces undergo astigmatism corresponding to defocusing of the light fluxes on the signal recording surface of the magneto-optical disc by being passed through the cylindrical lens 10. Consequently, the difference between the sum signals of the light detection signals by the light-receiving surfaces arrayed in the direction along which the astigmatism is produced and the sum signals of the light detection signals by the light-receiving surfaces arrayed in the direction normal to the direction along which the astigmatism is produced, that is (A C)−(B+D), where A, B, C and D indicate the light detection signals by the first to fourth light-receiving surfaces 13a to 13d, respectively, represents a so-called focusing error signal indicating the degree of defocusing produced on the signal recording surface of the magneto-optical disc.

Figure 3:
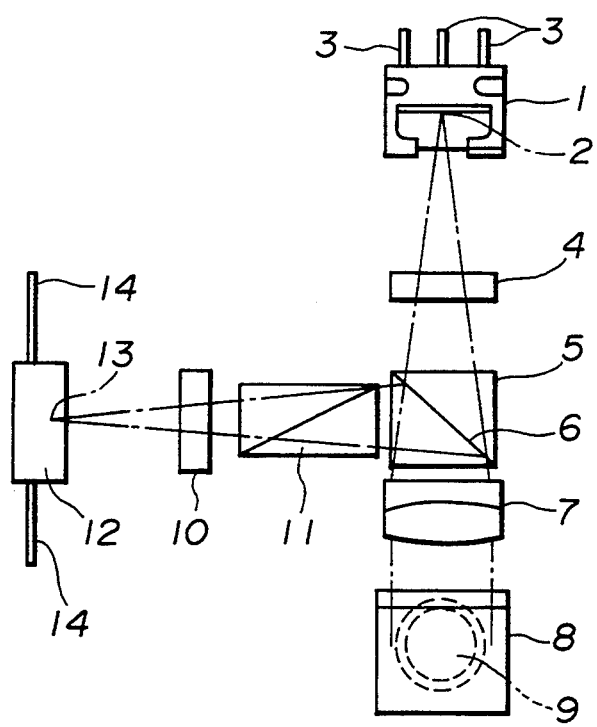
FIG. 3 is a schematic plan view showing the construction of a modification of an optical pickup apparatus according to the present invention.
Figure 4:
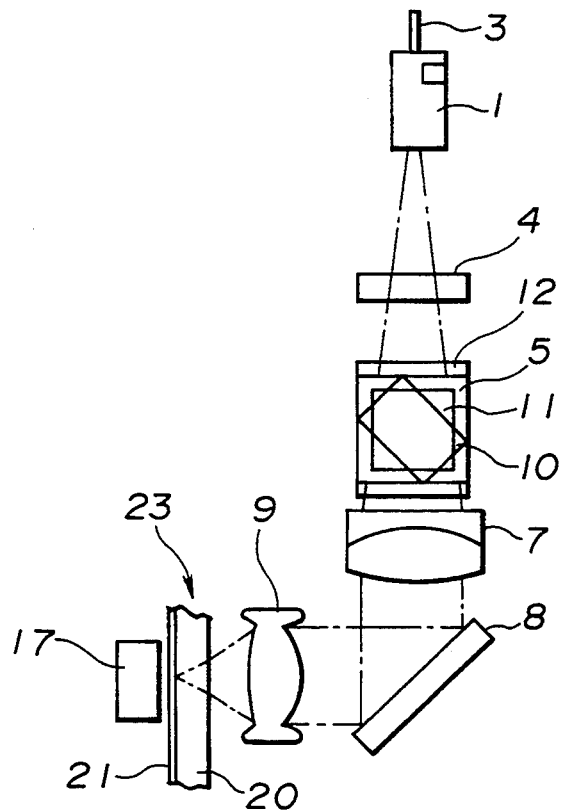
FIG. 4 is a schematic side elevational view showing the construction of the optical pickup apparatus shown in FIG. 3.

In the above-described optical pickup apparatus, the relative position between the cylindrical lens 10 and the three-beam Wollaston prism 11 may be exchanged, as in the alternative embodiment of FIGS. 3 and 4. In this case, the light fluxes reflected by the reflective film 6 of the polarized beam splitter 5 are transmitted through the three-beam Wollaston prism 11 and then through cylindrical lens 10 before being converged on the light-receiving surface of the photodetector 13.

When writing information signals on the magneto-optical disc using the optical pickup apparatus, the light flux radiated by the laser diode 2 is converged on the signal recording surface which is the boundary surface between the disc substrate 20 and the signal recording layer 21 of magneto-optical disc 23 for locally heating the signal recording surface 21, as shown in FIG. 4. Simultaneously, an external magnetic field is applied by the magnetic head device 17 to the signal recording layer 21. The object lens 9 is driven so as to be moved depending on various control signals, such as focusing error signals or tracking error signals produced by photodetector 13 for adjusting the state of convergence of the light fluxes on the signal recording layer 21 or the position of radiation of the light fluxes on the signal recording layer 21.

The information signals may be read by the optical pickup apparatus from the magneto-optical disc 23 on the basis of signals obtained from photodetector 13 while the light flux radiated by the laser diode 2 is converged on the signal recording layer 21.

The optical pickup apparatus according to the present invention is not limited to the above-described embodiments. Thus, as shown in FIG. 7, a planar plate 15 carrying a semi-transmitting film 16 thereon may be arranged between the object lens 9 and the photodetector 13 at an inclined position with respect to the light path the polarized light beam splitter 5.

Figure 7:
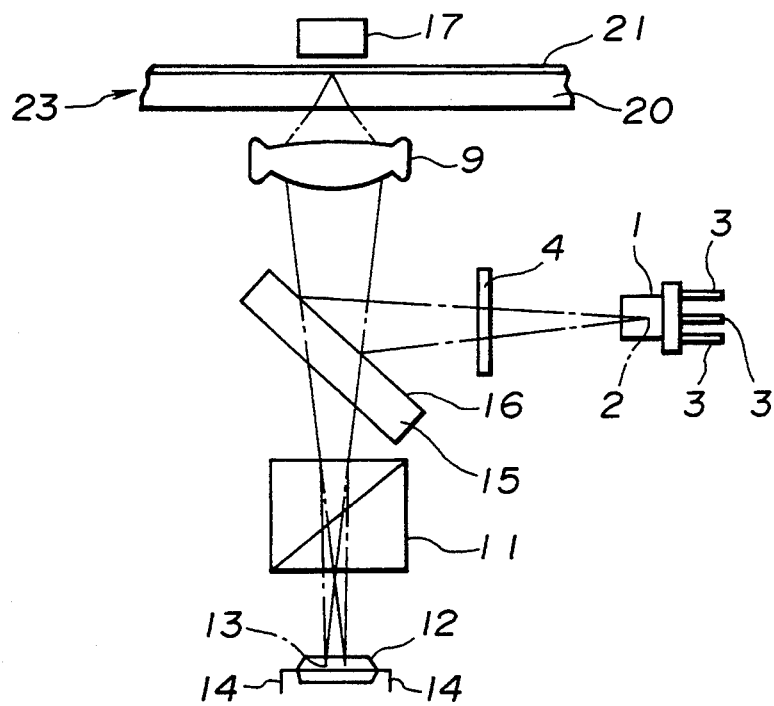
FIG. 7 is a schematic side elevational view showing a further modification of the optical pickup apparatus according to the present invention.

In the optical pickup apparatus of FIG. 7, the light flux radiated from laser diode 2 is first transmitted through diffraction grating 4 and reflected by the semi-transmitting film 16 of the planar plate 15 before being incident on the object lens 9. The light flux is converged by the object lens 9 on the signal recording surface which is the boundary surface between the disc substrate 20 and the signal recording surface 21 of the magneto-optical disc 22.

The light fluxes converged on the signal recording surface are reflected by the signal recording surface before being incident as a reflected light flux on the object lens 9. The reflected light flux re-incident on the object lens 9 is re-incident on the semi-transmitting film 16 in the form of a converged light flux. The reflected light flux re-incident on the semi-transmitting film 16 is partially transmitted through the semi-transmitting film 16 before being incident on the three-beam Wollaston prism 11. The reflected light flux transmitted through the three-beam Wollaston prism 11 while being converged is finally converged on the light-receiving surface of the photodetector 13.

In the optical pickup apparatus of FIG. 7, the reflected light flux undergoes astigmatism when transmitted through planar plate 15, so that there is no necessity of providing a cylindrical lens such as is provided in the optical pickup apparatus of the embodiment of FIG. 4. The object lens of the optical pickup apparatus of FIG. 7 has so-called finite system characteristics so that there is no necessity of providing a collimator lens such as that used in the optical pickup apparatus of the embodiment of FIG. 4.

In each optical pickup apparatus according to the present invention, the light flux propagates along a light path from the light source as a diverging light flux to an object lens which converges the light flux on the information signal recording medium after propagating through a light flux dividing device arranged at a position on the light path where the light flux remains a diverging light flux. Consequently, the reflected light flux from the recording medium is transmitted through the polarized light dependent light flux dividing device while being converged so as to be ultimately converged on a photodetector adapted for detecting the reflected light flux.

Consequently, with the present optical pickup apparatus, the void space between the light source and a collimator lens collimating the light flux radiated from the light source may be utilized effectively. Besides, with the inventive optical pickup apparatus, it is unnecessary to provide a converging lens at the light flux incident side of the photodetector.

Meanwhile, in the optical pickup apparatus according to the present invention, the light flux reflectance in the light flux separating device may be properly set for preventing double refraction in the light flux separating device.

What is claimed is:

1. An optical pickup apparatus for recording information signals on an optical recording medium, comprising:

a light source which radiates a diverging light beam;

an objective lens on which the light beam radiated from said light source is incident and which converges the light beam on said optical recording medium;

a polarized beam splitter arranged at a position along a first optical path between the light source and the objective lens, at which said polarized beam splitter receives the diverging light beam from the light source before said diverging light beam has propagated through the objective lens, wherein said polarized beam splitter deflects a reflected light beam that has converged on said optical recording medium and been reflected by said optical recording medium out of said first light path to a second light path;

detecting means for detecting the reflected light beam deflected to the second light path by the polarized beam splitter;

a deflecting device, arranged between the polarized beam splitter and the objective lens, for deflecting an optical path of each beam incident thereon from the polarized beam splitter by an angle substantially equal to 90 degrees;

a prism for generating three light beams each having a different polarization in response to the reflected light beam from the polarized beam splitter, said prism being arranged between the polarized beam splitter and the light detecting means at a converging point of said reflected light beam on the second light path; and an optical element arranged on the second light path between the polarized beam splitter and the prism, said optical element generating astigmatic aberration in the reflected light beam from the polarized beam splitter and converging said reflected light beam from the polarized beam splitter on the detecting means.

2. An optical pickup apparatus for recording information signals on an optical recording medium, comprising:

a light source which radiates a diverging light beam;

an objective lens on which the light beam radiated from said light source is incident and which converges the light beam on said optical recording medium;

a polarized beam splitter arranged at a position along a first optical path between the light source and the objective lens at which said polarized beam splitter receives the diverging light beam from the light source before said diverging light beam has propagated through the objective lens, wherein said polarized beam splitter deflects a reflected light beam that has converged on said optical recording medium and been reflected by said optical recording medium out of said first light path to a second light path;

detecting means for detecting the reflected light beam deflected to the second light path by the polarized beam splitter;

a deflecting device, arranged between the polarized beam splitter and the objective lens, for deflecting an optical path of each beam incident thereon from the polarized beam splitter by an angle substantially equal to 90 degrees;

a prism for generating three light beams each having a different polarization in response to the reflected light beam from the polarized beam splitter, said prism being arranged between the polarized beam splitter and the light detecting means at a converging point of said reflected light beam on the second light path; and an optical element arranged on the second light path between the prism and the detecting means, said optical element generating astigmatic aberration in the reflected light beam from the prism and the polarized beam splitter and converging said reflected light beam on the detecting means.

3. An optical pickup apparatus for recording information signals on an optical recording medium, comprising:

a light source which radiates a diverging light beam;

an objective lens on which the light beam radiated from said light source is incident and which converges the light beam on said optical recording medium;

a polarized beam splitter arranged at a position along a first optical path between the light source and the objective lens at which said polarized beam splitter receives the diverging light beam from the light source before said diverging light beam has propagated through the objective lens, wherein said polarized beam splitter deflects a reflected light beam that has converged on said optical recording medium and been reflected by said optical recording medium out of said first light path to a second light path;

detecting means for detecting the reflected light beam deflected to the second light path by the polarized beam splitter;

a deflecting device, arranged between the polarized beam splitter and the objective lens, for deflecting an optical path of each beam incident thereon from the polarized beam splitter by an angle substantially equal to 90 degrees;

a prism for generating three light beams each having a different polarization in response to the reflected light beam from the polarized beam splitter, said prism being arranged on the second light path between the polarized beam splitter and the light detecting means in a converging optical path of the reflected light beam from the polarized beam splitter; and an optical element arranged on the second light path between the polarized beam splitter and the prism, said optical element generating astigmatic aberration in the reflected light beam from the polarized beam splitter and converging said reflected light beam from the polarized beam splitter on the detecting means.

4. An optical pickup apparatus for recording information signals on an optical recording medium, comprising:

a light source which radiates a diverging light beam;

an objective lens on which the light beam radiated from said light source is incident and which converges the light beam on said optical recording medium;

a polarized beam splitter arranged at a position along a first optical path between the light source and the objective lens at which said polarized beam splitter receives the diverging light beam from the light source before said diverging light beam has propagated through the objective lens, wherein said polarized beam splitter deflects a reflected light beam that has converged on said optical recording medium and been reflected by said optical recording medium out of said first light path to a second light path;

detecting means for detecting the reflected light beam deflected to the second light path by the polarized beam splitter;

a deflecting device, arranged between the polarized beam splitter and the objective lens, for deflecting an optical path of each beam incident thereon from the polarized beam splitter by an angle substantially equal to 90 degrees;

a prism for generating three light beams each having a different polarization in response to the reflected light beam from the polarized beam splitter, said prism being arranged on the second light path between the polarized beam splitter and the light detecting means in a converging optical path of said reflected light beam from the polarized beam splitter; and an optical element arranged on the second light path between the prism and the detecting means, said optical element generating astigmatic aberration in the reflected light beam from the prism and the polarized beam splitter and converging said reflected light beam on the detecting means.

* * * * *